Figure 1:
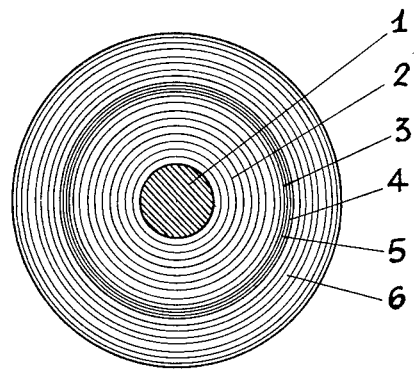

June 13, 1961

H. THEVENON 2,988,467

PROCESS FOR THE MANUFACTURE OF HIGH VOLTAGE ELECTRIC
CABLE WITH MULTI-PART INSULATION

Filed March 14, 1955

INVENTOR
HENRI THEVENON

BY *Paul M. Craig Jr.*

ATTORNEY.

2,988,467
PROCESS FOR THE MANUFACTURE OF HIGH VOLTAGE ELECTRIC CABLE WITH MULTI-PART INSULATION

Henri Thevenon, Lyon, France, assignor to Compagnie Generale d'Electricite, Paris, France, a corporation of France Filed Mar. 14, 1955, Ser. No. 494,080
Claims priority, application France Mar. 22, 1954
3 Claims. (Cl. 154—2.27)

High-tension electric cables contain a relatively great thickness of insulation. Taping machines of conventional length do not usually allow of such insulation being applied in a single step or pass through the machine, it often being necessary for the cable to be collected after a first passage through the machine and passed therethrough a second time and possibly a third time. Before a paper-insulated cable can be passed through the machine a second time, the cable must first be wound on to a winding drum. The creases formed on the exterior of the insulation remain after the cable has been passed through the machine a second time and form recesses which are of considerable depth as compared with the thickness of one paper, thus causing imperfect contact of this insulation with the inner surface of a subsequent layer of insulation applied to the cable. The insulation therefore acquires a weak spot at which ionization may occur, and it is well known that the dielectric strength of a cable which has been taped in a number of passes is 15 to 20% less than the dielectric strength of a cable produced in a single step.

The same disadvantage arises in the case of a cable incorporating several types of insulation, for example, if the first fraction or part of the insulation is formed by paper tapes and the second fraction or part is formed by a sheath made of insulating material and applied by extrusion. Air remains on the boundary surface between the two fractions forming the insulation.

It is an object of the present invention to provide a process which enables this disadvantage to be obviated by removing the air thus occluded from the influence of the electric field.

According to the present invention there is provided a process for the production of high-tension electric cables in which the insulation is divided into a number of concentric fractions or parts positioned in consecutive operations, wherein the step of positioning one fraction or part of the insulation in one pass is terminated by placing at least one semiconductive layer on the outer surface of the said fraction or part and the step of positioning the subsequent fraction of the insulation in the next pass is commenced by placing a further semiconductive layer on the first-mentioned semiconductive layer whereby the disadvantages resulting from the layer or pocket of air existing at the boundary between the said consecutive fractions is obviated.

It is a further object of the invention to provide an electric cable produced according to this process.

The conductive or semiconductive layers can take the form either of paper strips which are either metallized or impregnated or coated with a semiconductive substance such as carbon black, or of sheathings of a semiconductive plastic material which is applied by extrusion.

For a better understanding of the invention and to show how the same may be carried into effect reference is made to the accompanying drawings which illustrate two embodiments of an electric cable constructed in accordance with the invention.

Referring to the drawings, FIGURE 1 is a cross sectional view through a cable in which a conductor 1 is insulated by paper strips. A first fraction or part 2 of the insulation made in one pass through the machine is terminated by a semiconductive layer 3 formed, for example, by one or more semiconductive papers. When the cable during the next pass is passed through a machine to complete the thickness of the insulation, a semiconductive layer 4 is first applied to the outer semiconductive layer 3 of the first fraction or part 2, whereafter conventional insulating strips 6 are applied. After impregnation, any air which may have remained along boundary surface 5 between the two fractions or parts 2 and 6 of the insulation is enclosed between the semiconductive strips and is therefore removed from the influence of the electric field. Advantageously, the semiconductive layers 3 and 4 can be formed according to French patent specification No. 1,066,664 so as to produce intimate contact between the semiconductive layers and the insulating layers, thus making each composite layer consisting of a semiconductive portion and an insulating portion substantially free of air occlusions.

Figure 2:
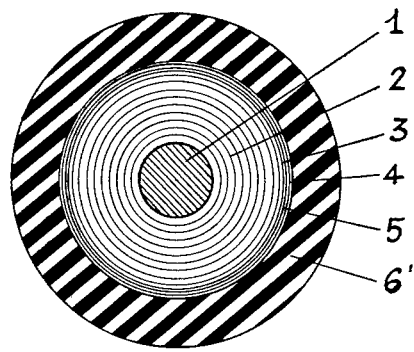

FIGURE 2 is a cross-sectional view showing how the invention can be applied to a cable having a mixed insulation comprising a first fraction or part in paper strip form and a second fraction or part of plastic material applied by extrusion to the first fraction.

According to the invention, a cable of this kind comprises a conductive or semiconductive paper layer which covers the first fraction or part of the insulation, and a plastic semiconductive layer on the inner surface of the second fraction or part of the insulation. In FIGURE 2 the conductor is denoted by 1 as in the embodiment shown in FIGURE 1, the first fraction or part of the insulation is denoted by 2, and the semiconductive layer terminating the first fraction or part 2 in the same pass through the taping machine is denoted by 3. The layer 3 is formed by metallised or semiconductive papers. After impregnation and before the cable is passed through the extrusion press which applies a plastic insulation 6', the layer 3 is covered by a thin layer 4 of semiconductive plastic material which is applied by extrusion. To the layer 4 there is then applied the second fraction or part 6' of the insulation. Thus, air which may exist at the boundary surface 5 is enclosed between the semiconductive layers and removed from the influence of the electric field.

The semiconductive plastic layer applied in sheath form by extrusion must be formed by a substance which adheres to the plastic material forming the outer fraction of the insulation, thus forming a continuous tube substantially free of air occlusions. For example, if the second fraction or part 6' is made of polyvinyl chloride, the layer 4 can be formed by polyvinyl chloride which has been rendered semiconductive by being mixed with carbon black, or if the second fraction 6' is made of polyethylene, the layer 4 can be formed by semiconductive butyl or polyisobutylene which adheres satisfactorily to polyethylene.

It will be manifest that the invention is applicable to cables in which the first fraction of the insulation is formed by strips of fibrous material or by strips of synthetic material instead of by paper strips.

What we claim is:

1. A method for the manufacture of a high-tension electric cable provided with an insulation formed by such a large number of layers of insulating tapes as to require several passes through a taping machine to apply said tapes to the cable in several parts corresponding to such passes comprising the steps of applying during the same pass through the taping machine at least one tape having at least an external semi-conductive surface after the application of the last insulating tape of that part of the insulation resulting from said first-mentioned pass, winding the cable on a drum after said first-mentioned pass, and thereafter applying during the next pass through the taping machine at first at least one tape having at least an internal semi-conductive surface and applying thereover during said next pass the first insulating tape of an additional part of the insulation whereby the danger due to the formation of detrimental air pockets between successively applied parts of the insulation during several passes through the taping machine, which may result by reason of lack of intimate contact between the insulating tapes of said successively applied parts of the insulation due to handling of the cable at the end of each pass, such as winding on the drum, is effectively eliminated.

2. A method according to claim 1 wherein the steps of applying the tape having at least an external semi-conductive surface takes place by means of the same machine with which the first-mentioned part of the insulation is applied, while the step of applying the tape having at least an internal semi-conductive surface takes place by means of the same machine with which said next part of the insulation is applied.

3. A method for the manufacture of a high-tension electric cable provided with an insulation formed by such a large number of layers of insulating material as to require several passes through apparatus for applying said material to the cable in several parts corresponding to such passes, comprising the steps of applying during the same pass through said apparatus at least one insulating layer having at least an external semiconductive surface after the completion of this first-mentioned pass, winding the cable on a drum after this first-mentioned pass, and thereafter applying during the next pass through said apparatus at first at least one layer having at least an internal semiconductive surface and applying thereover and in adherence thereto a further insulating portion of the cable insulation whereby the danger due to the formation of detrimental air pockets between successively applied parts of the insulation during successive passes through the apparatus, which may result by reason of lack of intimate contact between the insulating layers of said successively applied parts of the insulation due to handling of the cable at the end of each pass, such as winding on the drum, is effectively eliminated.

References Cited in the file of this patent
UNITED STATES PATENTS

| | | |
|---|---|---|
| 1,958,281 | Scott | May 8, 1934 |
| 2,102,129 | Rosch | Dec. 14, 1937 |
| 2,158,281 | Ford et al. | May 16, 1939 |
| 2,304,210 | Scott | Dec. 8, 1942 |
| 2,447,168 | Dean | Aug. 17, 1948 |
| 2,622,152 | Rosch | Dec. 16, 1952 |
| 2,690,469 | Perls | Sept. 28, 1954 |
| 2,834,828 | Ebel | May 13, 1958 |

FOREIGN PATENTS

| | | |
|---|---|---|
| 349,289 | Great Britain | May 28, 1931 |